Oct. 31, 1944. A. D. BLANCHARD 2,361,816
CONNECTOR
Filed April 8, 1943
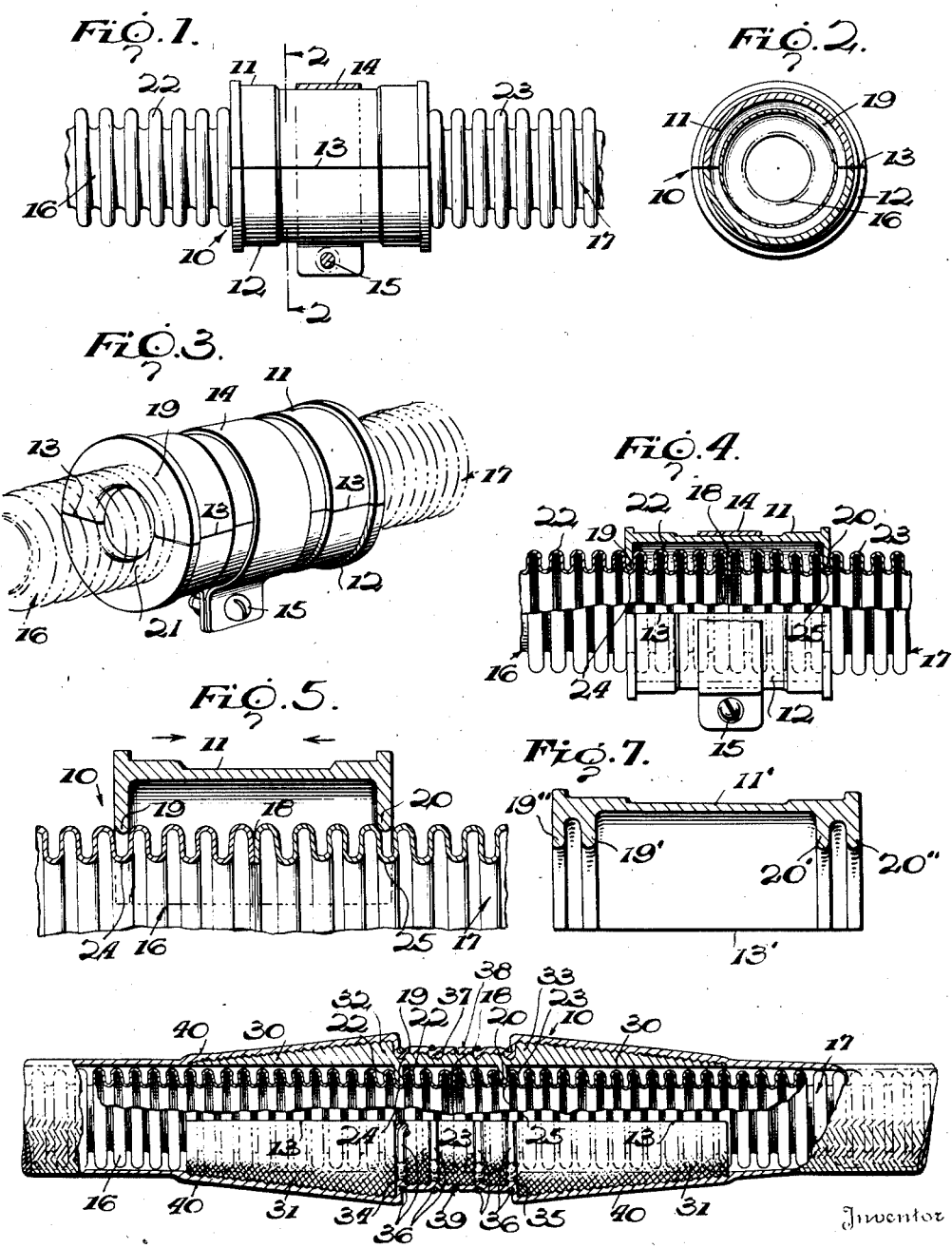
Inventor
Arthur D. Blanchard
By Martin J. Finnegan
Attorney Patented Oct. 31, 1944

2,361,816

UNITED STATES PATENT OFFICE 2,361,816

CONNECTOR

Arthur D. Blanchard, Bloomfield, N. J., assignor to Bendix Aviation Corporation, Bendix, N. J., a corporation of Delaware Application April 8, 1943, Serial No. 482,300

4 Claims. (Cl. 285—194)

This invention relates to connecting devices, and particularly to the connection of flexible, corrugated tubing or conduit.

It is an object of the present invention to provide a simple connector for joining adjacent ends of corrugated tubing.

It is an additional object of the invention to provide a connector for corrugated tubing that is simple in construction and that may be readily applied without the use of heat or of special tools.

Other objects will appear from a study of the following specification when made in conjunction with the attached drawing, throughout which like numerals designate like parts. It is to be understood, however, that the drawing is for the purpose of illustration only, and is not designed as a definition of the limits of the invention, reference being had to the appended claims for this purpose.

Fig. 1 is a plan view of one embodiment of the novel connector of the present invention.

Fig. 2 is a cross-section taken along the line 2—2 of Fig. 1.

Fig. 3 is a view in perspective of the coupling unit shown in Fig. 1.

Fig. 4 is an elevational view of the same embodiment of the invention, with certain parts being shown in longitudinal section;

Fig. 5 is a longitudinal, sectional view showing a part of the coupling unit prior to application to tubing ends that are to be joined;

Fig. 6 is a view partly in longitudinal section and partly in elevation of a second embodiment of the present invention; and Fig. 7 is a sectional view of a third form of coupling unit.

The coupling unit shown generally at 10 comprises two split semi-cylindrical shells 11 and 12, which are in abutment along the surface 13, and which are fastened together by a split strap clamp 14, having its ends joined together by a nut and bolt connection at 15. Two corrugated sections of tubing or conduit 16 and 17 extend within connector 10, and the end corrugations are in contact along the line 18.

Cylindrical shell 11 has inwardly projecting semi-annular flanges 19 and 20 formed integrally at its ends, and shell 12 has similar flanges, only one of which (21) is shown in Fig. 3. Flange 19 engages adjacent corrugations 22 of tubing 16, and flange 20 engages adjacent corrugations 23 of flexible tube 17. Flanges 19 and 20 will preferably be formed of such thickness that they are snugly received between the corrugations 22 and 23, respectively. Also, they are of such depth that when they are in engagement with the bottom or troughs 24 and 25, respectively, the shell portions 11 and 12 are in contact along the surface 13.

The semi-cylindrical shell 11 is shown in Fig. 5 just prior to application of the shell to the corrugated tubing sections 16 and 17. Pressure in the direction indicated by the arrows in Fig. 5 is exerted upon the two sections, forcing the end corrugations into engagement at 18. Then, as shell 11 is applied, the camming action upon the side walls of the corrugations by the flanges 19 and 20 will force the end corrugations into tight engagement.

In certain instances, the corrugated tubing may be covered with braided or woven wire. Fig. 6 shows an embodiment of the invention that is intended as a connector of braid covered tubing. Shell members 30 and 31 are semi-annular, and have semi-cylindrical inner surfaces and conically extending outer surfaces 32, 33 and 34, 35, respectively, tapering outwardly to the opposite extremities of members 30 and 31. Sections 16 and 17 of corrugated tubing are held within shell members 30 and 31, and the unit is maintained in assembly by a plurality of wire loops 36 secured over the end portions of the abutting braided sleeves, to press the latter within grooves 37 formed on the central, cylindrical outer surfaces 38, 39 of each of the sections 30 and 31, respectively. The outer surfaces 32, 33, 34 and 35 are knurled or otherwise roughened, and surfaces 38 and 39 may be so formed. The braid 40 extending over tubing sections 16 and 17 tightly engages the tapering surfaces 32, 33, 34 and 35 and the knurling affords a secure gripping medium to aid the loops 36 in preventing slipping of the braid after it has been put over the connector unit. Braid 40, prior to assembly of unit 10, may be pulled back sufficiently from the open ends of tubing sections 16 and 17 so that shells 30 and 31 may be applied, after which the braid is secured with tie wire loops 36.

The novel connector above described is particularly adapted for the quick or emergency connection of broken flexible tubing, which may be used as radio shielding for wires carried within the tubing, or as a conduit for a fluid, such as oil. Instead of the clamp 14, which is shown in Figs. 1, 3 and 4 as embracing the shells 11 and 12, friction tape or binding wire might be used to maintain the unit in assembly. It has been found that the connecting unit 10, when made of metal, such as brass, forms a good conducting path between the tubing sections 16 and 17, and thus, in the case of a grounded shield for radio wires, the present connector is quite satisfactory when applied as an emergency connector on aircraft, tanks, or other military or naval vehicles carrying radio equipment. When the unit 10 is to be used as a connector for liquid conduit sections, a few turns of friction tape may be applied directly over the area of the end corrugations of tubing sections 16 and 17 prior to the application of the shells 11 and 12.

Fig. 7 shows a coupling unit in which two flanges 19', 19" replace the single flange 19 of Fig. 5, and similarly flanges 20', 20" replace flange 20 of Fig. 5. These flanges are shorter than in Fig. 5, and thus are better adapted for use over braid-covered tubing, in which case the flanges act to press the braid into the tube corrugations and thus secure the parts in assembled relationship.

In the form of the invention shown in Figs. 1 to 5, inclusive, it will be understood that methods and means other than the clamp 14 may be employed to maintain the unit in assembly. Likewise, other changes may be resorted to in the use of any of the embodiments of the invention illustrated herein without departing from the essence of the invention as defined in the appended claims.

What is claimed is:

1. In combination with two sections of flexible, corrugated tubing, means for joining adjacent ends of said tubing, comprising identical lengths of semi-cylindrical shells, each of said shells having a semi-annular, inwardly projecting flange at each end thereof, said flanges extending for a considerable distance radially of the axis of the tubing to substantially fill the space between corrugations of said tubing, and clamp means connected about said shells for holding said shells together.

2. In combination with two sections of corrugated tubing, means for joining adjacent ends of said tubing, comprising a pair of split cylindrical shells overlying the ends of said tubing, flange members formed at each end of said split shells, said flanges extending for a considerable distance radially of the axis of the tubing to substantially fill the space between adjacent corrugations of said tubing, and means for maintaining said split shells together in cylindrical form.

3. A connecting unit for corrugated tubing, said unit comprising generally semi-cylindrical split shell members, corrugation engaging flanges substantially filling the space between opposing walls of adjacent corrugations, said flanges being formed integrally with each of said shell members, and means embracing said split shell members for maintaining said members together in generally cylindrical relation.

4. A connecting unit for braid-covered, corrugated tubing, said unit comprising semi-cylindrical split shell members having cylindrical inner surfaces and conically extending, roughened braid engaging outer surfaces, said conically extending surfaces tapering toward the extremities of said unit, corrugation engaging flanges substantially filling the space between opposing walls of adjacent corrugations, said flanges being formed integrally with each of said shell members, and means embracing said split shell members for maintaining said members together in generally cylindrical relation.

ARTHUR D. BLANCHARD.